United States Patent [19]

Beere

[11] Patent Number: 5,501,180

[45] Date of Patent: Mar. 26, 1996

[54] ELASTIC AND FLEXIBLE ANIMAL COLLAR

[75] Inventor: Richard F. Beere, Waterford, Wis.

[73] Assignee: Beere Tool Company, Inc., Racine, Wis.

[21] Appl. No.: 385,566

[22] Filed: Feb. 8, 1995

[51] Int. Cl.$^6$ ........................................ A01K 27/00

[52] U.S. Cl. .................... 119/858; 119/863; 40/304; 2/338; 63/5.1

[58] Field of Search .................. 119/858, 863, 119/864, 865, 856, 857; 2/338, 311, 314, 317, 318; 40/303, 304; 24/31 F, 31 L; 63/5.1

[56] References Cited

U.S. PATENT DOCUMENTS

| | | |
|---|---|---|
| 2,461,201 | 2/1949 | Ellis ................................................ 2/311 |
| 2,539,098 | 1/1951 | Pettigrew . | |
| 2,648,150 | 8/1953 | Sullivan . | |
| 2,810,368 | 10/1957 | McCombe . | |
| 3,063,058 | 11/1962 | Vollet ............................................. 2/338 |
| 4,377,872 | 3/1983 | Daniell, Jr. ..................................... 2/338 |
| 5,038,718 | 8/1991 | Pfleger .......................................... 119/856 |

FOREIGN PATENT DOCUMENTS 278477  10/1927  United Kingdom ............... 119/863

*Primary Examiner*—Todd E. Manahan
*Attorney, Agent, or Firm*—Arthur J. Hansmann

[57]  ABSTRACT

An animal collar having both elastic and flexible extendable and contractable characteristics and being made of a silicone rubber. The collar is of a serpentine shape which permits it to flex in the expansion and contraction of the circumference of the collar, and the elastic characteristic permits it to also expand and contract, all to accommodate the neck size of an animal and to support an identification tag.

17 Claims, 1 Drawing Sheet

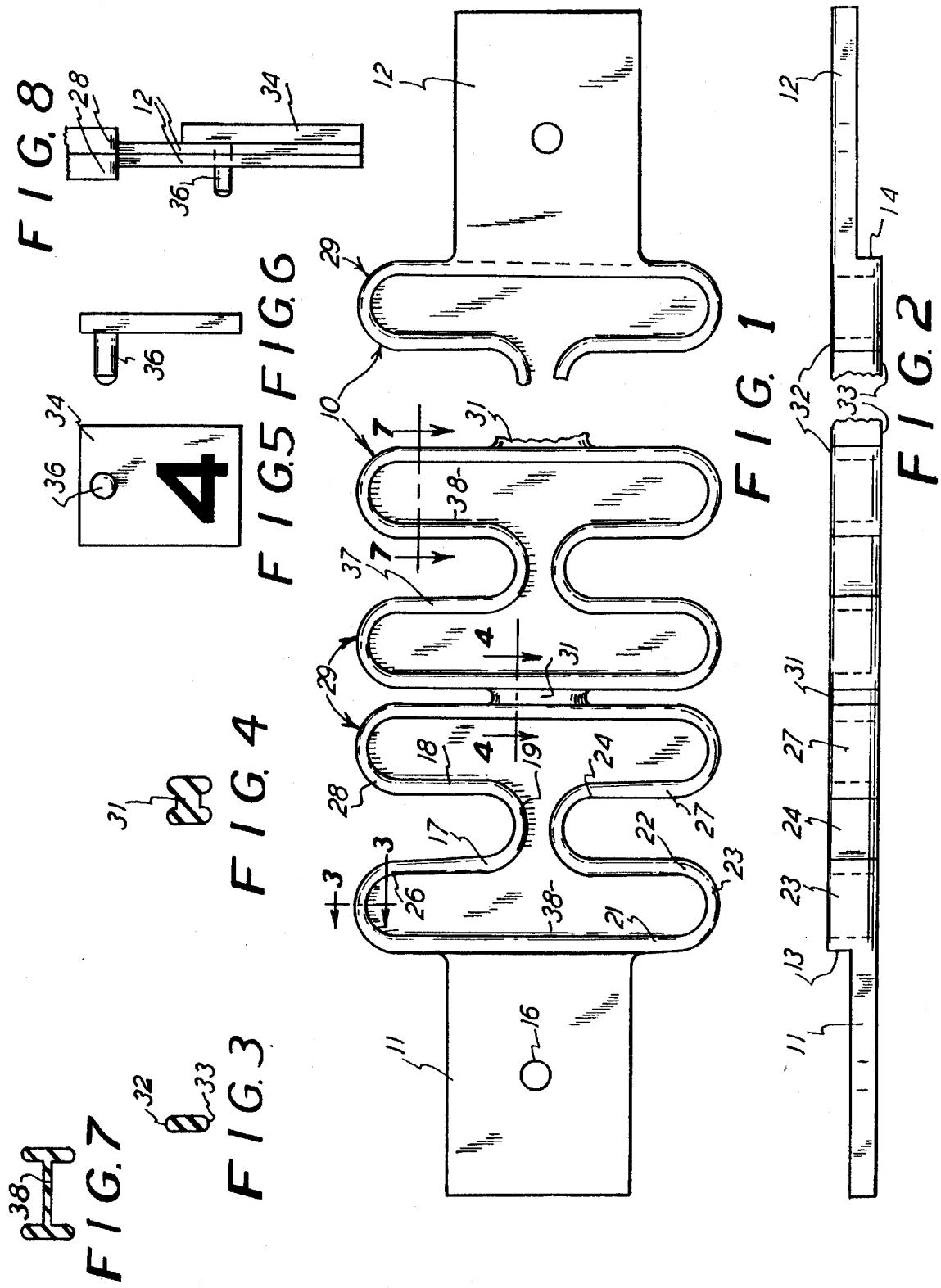

5,501,180

ELASTIC AND FLEXIBLE ANIMAL COLLAR

This invention relates to an animal collar having both elastic and flexible extendable and contractable characteristics. More particularly, it relates to a collar which is made of a molded silicone rubber and it is both flexible and elastic for producing the expansion and contraction of the collar circumference on an animal's neck.

BACKGROUND OF THE INVENTION

Animal collars having expandable and contractable characteristics already known in the prior art. Such collars are commonly made of elastic material which inherently expands and contracts, and in some instances the expansion permits the collar to be slipped over the animal's head without opening the collar. Also, the prior art is aware of elasticized animal collars which have identification tags attached thereto. U.S. Pat. No. 2,810,368 is acknowledged herein as showing an expandable and contractable animal collar. Likewise, U.S. Pat. Nos. 2,539,098 and 2,648,150 are acknowledged as showing animal collars with identification tags attached.

In the present invention, the animal collar is made of an expandable and contractable material to accommodate the pressures such as those exerted by the neck of the animal wearing the collar or by any object pulling on the collar. However, the free-body configuration of the collar, that is, when there is no force on the collar, is such that the collar will be confortably snug on the neck of the animal even though it can be slipped off over the head of the animal in even unusual circumstances, such as when the collar is inadvertently attached to an object which would otherwise restrain the movement of the animal. That is, if the animal had its collar caught on a fence or on vegetation or the like, then the animal would not be restrained, but instead could actually pull its head out of the collar and release itself without being unduly restrained or injured.

Still further, in an example of utilizing the collar for sheep, the growth of wool underneath the collar could cause an ordinary collar to become tight on the sheep's neck. However, in this invention the collar will automatically expand to accommodate the undergrowth of wool and will therefore not choke or otherwise annoy the sheep wearing the collar.

Still further, the collar of this invention can be made basically in one size such that the overall circumference of the collar when it is disposed in a circle will accommodate the various neck sizes of animals without actually being too loose or too tight, but instead only always assuming a snug fit on the animal's neck. This objective is achieved through the combined flexibility and elasticity possessed by the collar of this invention.

Still further, the collar of this invention is arranged such that an identification tag can be attached to the collar, and, in fact, the tag itself can serve as a fastener for presenting and holding the collar in a restrained circle on the animal's neck. Again, as with sheep or the like, and in the context mentioned above, collars commonly are not used because of the expansion and contraction requirements of the collar, and therefore the animal usually has an identification tag placed on its ear which is therefore pierced. If that ear tag becomes entangled with a foreign object, then the animal is inclined to pull away to a consequence of where the animal injures its own ear where the tag was attached. Other objects and advantages will become apparent upon reading the following description in light of the accompanying drawings.

BRIEF DESCRIPTION OF THE DRAWINGS

FIG. 1 is a plan view of a collar of this invention, with a portion thereof broken away.

FIG. 2 is a side elevational view of FIG. 1.

FIGS. 3 and 4 are sectional views taken on the line 3—3 and 4—4, respectively.

FIG. 5 is a front elevational view of an identification tag.

FIG. 6 is a side elevational view of FIG. 5.

FIG. 7 is a sectional view taken on the line 7—7 of FIG. 1.

FIG. 8 is a side view of a modification of the collar's end, with a tag attached.

DETAILED DESCRIPTION OF THE PREFERRED EMBODIMENT

The collar is shown to be elongated and is preferably formed in a molding process and presents the intermediate portion, generally designated 10, and the opposite ends 11 and 12, all disposed in one length or elongated configuration, such as in a belt-like form. It will of course be readily understood that the shown collar can be flexed into a circular configuration to therefore fit around the neck of an animal when the two ends 11 and 12 are overlapped and are actually nested together by means of their shouldered configurations at 13 and 14, respectively. Each end 11 and 12 has an opening 16, and the two openings 16 can be aligned with each other and a fastener can be inserted through the opening 16 to hold the ends 11 and 12 adjacent each other when the collar is in the circular configuration on an animal's neck.

The feature of this invention is to have the collar constructed of a material and in an arrangement such that the collar has flexibility and elasticity combined. In that arrangement, when the collar is on the neck of an animal, it will be snug thereon, but it is also capable of expanding in its circumference so that it will not choke or be uncomfortably tight, but will be self-adjusting according to the neck size of the animal. In accomplishing that expansion and contraction autonomy, the collar intermediate portion 10 is arranged in a serpentine configuration defined by the U-shapes shown in the upper half of FIG. 1 wherein the upright extents 17 and 18 form the upright lengths of the U-shape, and the lower semi-circular extents 19 form the interconnecting portion of the U-shape. Likewise, the lower half of the collar as seen in FIG. 1 presents the U-shape in the upright extent designated 21 and 22 and in the semi-circular interconnecting lower U-shape portion 23, and thus the U-shapes in the upper half and lower half are presented as shown and described.

Further, the two U-shapes identified with reference numerals, as mentioned, have mirror image U-shapes such as that shown by the U-shape designated 24 and the U-shape designated 26 on the left end in FIG. 1. Further, there is another U-shape immediately to the right of the U-shapes at the left end in FIG. 1, and those two U-shapes are designated 27 and 28.

In summary, there are the first two aforementioned U-shapes toward the longitudinal center line in FIG. 1 and the four other U-shapes which are In mirror image and at the top and bottom of FIG. 1 and as described. Those six U-shapes configurations comprise one segment, designated 29, and the entire elongated collar is made up of identical segments 29, such as shown in FIG. 1. These segments 29 are physically connected together by means of an interconnection of material at 31, and of course the left and right end segments 29 are integral with the respective left and right ends 11 and 12, as shown.

Accordingly, the collar is of a serpentine shape having the undulations presented by the mirror image that U-shapes describe, such as the six U-shapes in each segment 29.

As mentioned, the material from which the collar is produced is a silicone rubber which is both flexible and also is non-irritating and non-allergenic so that it is not dangerous in use on the animal. FIG. 1 shows the collar in its free-body position which is its position when there is no force applied to the collar. However, when the collar, in its circular form, is to expand in the circumference of the circle, the first movement of the collar will be in the flexing of the collar in its six U-shaped portions in each segment 29. That is, the two legs of each U-shape will tend to move away from each other and thus reduce the semi-circular curvature of the U-shape, such as that curvature designated 19. At that point, the force tending to expand the circumference will simply have flexed the collar to open the U-shapes, as described, and thus permit the collar to become larger or expanded in its circle and that occurs only through the flexing of the collar. The collar is thus arranged so that if either side 32 or 33 was then in contact with the animal's neck, those two sides 32 and 33 are smooth and planar so that they do not embed within the fur or neck of the animal but are free to slide along the fur or neck and thus perform the expansion described and not irritate the animal. Further, FIG. 3 shows that the faces 32 and 33 are formed of a semi-circular configuration so that there is further enhancement of the sliding function of the collar on the animal's neck and thus the avoidance of pulling or irritation.

The property of the material forming the collar, such as the silicone rubber mentioned, is of a characteristic that the U-shapes will flex upon initial expansion of the collar, as described, and subsequently the undulations extending through each segment 29 will expand or stretch if the force on the collar is sufficient to require such stretching after the sufficient degree of flexibility of the U-shapes has transpired.

Accordingly, the collar has the dual function of flexing and elastically stretching, in sequence, and thus there will always be a definite and firm configuration in the total circumference of the collar's circle to thereby be snug on the animal's neck, but it will not be loose thereon or so weak that it will easily slide over the animal's head. Instead, the collar will assume its free-body configuration in each segment 29, such as shown in FIG. 1, or it will initially flex to open the U-shapes and thereby extend the circumference and it will then ultimately stretch through the U-shapes in the elongation of the material in the collar and forming the U-shapes, all to produce a snug fit on the neck, but an adjusted fit according to the force applied to the collar whether it be the undergrowth of fur or wool or a foreign object pulling on the collar, such as when the animal is in a trapped position. This arrangement is particularly useful where the collar is used for sheep, for instance, where it is desirable to place an identification tag on the sheep without piercing the sheep's ear and nevertheless having the collar expandable or contractable to adjust to the overall size of the sheep's neck, including the growth or removal of the wool on the sheep's neck.

FIGS. 5 and 6 show an identification tag 34 which shows a number "4", and the tag has a fixed post 36 which fits snugly in the collar opening 16 to thereby present the tag 34 on the collar and also to serve as the fastener for securing the collar ends 11 and 12 together in the circular configuration of the collar when it is on the animal's neck.

Accordingly, the zig zig or undulation configuration shown in FIG. 1 in each segment 29 is the serpentine shape mentioned, and in its free-body configuration in FIG. 1, it has the amplitude or degree of undulations shown. Of course when the collar is stretched, then the amplitude of the undulations is lessened as each of the of the material strands, such as the portion designated 37, as being a strand, through the three upper U-shapes in each segment 29, and of course through the three lower U-shapes in each segment 29, and it is that strand 37 which actually has a greater overall length once it is stretched or the elasticity is activated in the expansion of the collar after the flexibility is exhausted or limited.

In the terminology utilized herein, the "elastic" collar means the property of the collar being capable of stretching in response to force, and to autonomously contract to regain the original shape of the collar after the force is removed; and "flexible" means the property of the collar being capable of bending in response to force, and to autonomously regain the original shape of the collar after the force is removed.

The opposite sides 32 and 33 are thus shown to extend in two parallel planes, and the sides are planar and do not deviate from the two planes indicated 32 and 33. Therefore, the collar is arranged such that it is endlessly in contact with the animal's neck, say, for instance, along the surface 32 which is the inner circumference of the collar, and the circular collar does not protrude from the animal's neck, and that would be along the circumference 33. Accordingly, the collar conforms to the animal's neck and does not protrude therefrom so that it does not have any portion standing up or extended from the neck and being susceptible to being caught by any foreign object. Thus, the strands of the collar which present the heretofore described U-shaped configurations extend continuously in one plane prior to having the collar placed in a circular configuration, and at that time the circular collar also has no protrusion of any of the strands forming the collar, as described.

FIG. 7 shows that there is an elastic web 38 integral with the aforementioned and of a thin width and being connected with the serpentine portions, as shown. As such, the web 38 is elastic and adds additional strength, or expansion resistance, throughout the collar. The serpentine portions initially flex in the expansion, and also the web 38 stretches because it is elastic. Upon full flexing of the serpentine portions to where they are virtually straight, then they too will stretch for further collar expansion. The web 38 is of a thickness, as seen in FIG. 7, to be no more than one-sixth the dimension of the flanking serpentine portions, as seen in height in FIG. 7, and is 0.010 inches thick.

The serpentine shape provides the desired expansion, and full self-contraction to original shape, while avoiding covering the animal's neck for the full width of the serpentine shape, as viewed in FIG. 1; that is from extreme top to extreme bottom of FIG. 1.

The entire collar is made of silicone rubber. With the web 38, additional strength is achieved, but only the serpentine portion is in contact with the neck while the web 38 is spaced therefrom for ventilation.

FIG. 8 shows that both collar ends can be shaped like end 12, and thus positioned flush with each other. The tag 34 can then pierce the holes 16 to secure the collar in a closed end-to-end position around the neck. The tag 34 is also flush with the end 12 to depend thereon and thus be readily applied and visible to stand off from the animal's neck. Also, as such, the tag is a collar fastener for holding the collar ends together.

One example of the relative dimensions is the height from 32 to 33, in FIG. 3, can be ³⁄₁₆", and, as mentioned, the thickness of the web 38 of FIG. 7 can be 0.010". Thus, the web 38 is considerably narrower than the strand forming the serpentine shape.

In addition to the silicone rubber mentioned, the collar can be made of any elastomer material which has the properties of flexibility and elasticity, as described.

What is claimed is:

1. An animal collar having both elastic and flexible extendable and contractible characteristics, comprising an elongated piece of elastic and flexible material for conforming to the shape of a circle for positioning around the neck of an animal, said piece being elastic to be capable of extending and contracting in its circular shape around an animal's neck when fitted thereon and thereby be arranged to be snug on the animal's neck when fitted thereon and thereby be arranged to be snug on the animal's neck and in self-adjusting expansion and contraction thereon, said piece being of serpentine shape along its length when in its free-body condition and also being flexible and thereby arranged to alter said serpentine shape and thereby expand and contract the size of said circle, said piece being composed of segments with an interconnector connected between each two adjacent segments, and said segments each consisting of two side-by-side rows of three end-to-end connected and side-by-side disposed upright and inverted U-shapes in each of said rows and arranged in mirror image along said rows.

2. The animal collar as claimed in claim 1, wherein said piece has two oppositely disposed planar ends which are positioned flat and coextensively on each other, said ends having aligned openings therein, and an identification tag with a prong in said openings for attaching said tag to said collar in a depending orientation.

3. The animal collar as claimed in claim 1, including a web integral with said segments and extending fully in all the space between said rows and being of said elastic and flexible material to expand and contract with said piece and being of a thickness less than that of said rows.

4. An animal collar having both elastic and flexible extendable and contractible characteristics, comprising an elongated piece of elastic and flexible material for conforming to the shape of a circle for positioning around the neck of the animal, said piece being elastic to be capable of extending and contracting in its circular shape around an animal's neck when fitter thereon and thereby be arranged to be snug on the animal's neck and in self-adjusting expansion and contraction thereon, said piece being of serpentine shape along its length when in its free-body condition and also being flexible and thereby arranged to alter said serpentine shape and thereby expand and contract the size of said circle, said piece being shaped to have two opposite sides extending through the length of said piece and with said sides lying along two spaced-apart and parallel planes and thereby being planar to endlessly extend on the animal's neck without being spaced therefrom, and said piece having two oppositely disposed planar ends which are positioned flat and coextensively on each other, said ends having aligned openings therein, and an identification tag with a prong in said openings for attaching said tag to said collar in a depending orientation.

5. The animal collar as claimed in claim 4, wherein said piece in its serpentine shape when in its contracted condition is of an amplitude of a first degree of serpentine undulations, and said piece being of an amplitude of a second degree of serpentine undulations which are of lesser amplitude than said first degree when said piece is expanded in the size of said circle.

6. The animal collar as claimed in claim 4, wherein said serpentine shape is arranged in two side-by-side rows with space therebetween and with each of said rows being both flexible and elastic.

7. The animal collar as claimed in claim 6, including a web integral with said rows and extending fully in all the space between said rows and being of said elastic and flexible material to expand and contract with said rows and being of a thickness less than that of said rows.

8. The animal collar as claimed in claim 4, wherein said serpentine shape is arranged in segments which each present serpentine undulations and which are disposed to form a row of said segments, and with said segments being attached together sequentially in said row.

9. An animal collar having both elastic and flexible extendable and contractible characteristics, comprising an elongated piece of elastic and flexible material for conforming to the shape of a circle for positioning around the neck of an animal, said piece being elastic to be capable of extending and contracting in its circular shape around an animal's neck when fitted thereon and thereby be arranged to be snug on the animal's neck and in self-adjusting expansion and contraction thereon, said piece being of serpentine shape along its length when in its free-body condition and also being flexible and thereby arranged to alter said serpentine shape and thereby expand and contract the size of said circle, said piece being shaped to have two opposite sides extending through the length of said piece and with said sides lying along two spaced-apart and parallel planes and thereby being planar to endlessly extend on the animal's neck without being spaced therefrom, and said elongated piece having two oppositely disposed free ends extending fully within said planes and being shaped to dovetail with each other and having aligned openings therein, and a tag including a prong disposed in said openings for releasably securing said free ends together.

10. The animal collar as claimed in claim 9, wherein said piece in its serpentine shape when in its contracted condition is of an amplitude of a first degree of serpentine undulations, and said piece being of an amplitude of a second degree of serpentine undulations which are of lesser amplitude than said first degree when said piece is expanded in the size of said circle.

11. The animal collar as claimed in claim 10, wherein said piece is shaped and capable of altering said circle of said collar to initially expand by flexing in response to a reduction of said amplitude of said serpentine shape and is subsequently capable of stretching by expanding in response to elastically stretching.

12. The animal collar as claimed in claim 9, wherein said serpentine shape is arranged in two side-by-side rows with space therebetween and with each of said rows being both flexible and elastic.

13. The animal collar as claimed in claim 12, wherein said two rows are arranged in mirror images of each other.

14. The animal collar as claimed in claim 12, including a web integral with said rows and extending fully in all the space between said rows and being of said elastic and flexible material to expand and contract with said rows and being of a thickness less than that of said rows.

15. The animal collar as claimed in claim 9, wherein said serpentine shape is arranged in segments which each present serpentine undulations and which are disposed to form a row of said segments, and with said segments being attached together sequentially in said row.

16. The animal collar as claimed in claim 15, wherein said segments include a U-shape in presenting said undulations, and with the U-shape including two legs joined together by an intermediate portion such that said legs move away from each other and from said intermediate portion when flexing in expansion.

17. The animal collar as claimed in claim 9, wherein said piece is made of silicone rubber material and is arranged and possesses properties of bending flexibility and modulus of elasticity whereby said circle is expanded by flexing of said piece to alter its serpentine shape prior to expansion of said piece in response to elastic stretching of said piece.

* * * * *